United States Patent [19]
Maletsky et al.

[11] Patent Number: 5,974,500
[45] Date of Patent: Oct. 26, 1999

[54] MEMORY DEVICE HAVING PROGRAMMABLE ACCESS PROTECTION AND METHOD OF OPERATING THE SAME

[75] Inventors: Kerry D. Maletsky, Monument, Colo.; James P. Ward, Raleigh, N.C.; Michael J. Steinmetz; Daryl C. Cromer, both of Cary, N.C.; Gregory Pruett, Durham, N.C.

[73] Assignee: Atmel Corporation, San Jose, Calif.

[21] Appl. No.: 08/971,117

[22] Filed: Nov. 14, 1997

[51] Int. Cl.$^6$ .............................. G06F 13/00; G11C 16/04
[52] U.S. Cl. ..................... 711/103; 711/108; 711/154; 365/120; 365/185.04; 365/189.05; 365/222
[58] Field of Search ..................... 711/103, 108, 711/154; 365/222, 120, 189.05, 185.04

[56] References Cited

U.S. PATENT DOCUMENTS

| | | | |
|---|---|---|---|
| 4,498,151 | 2/1985 | Henry | 711/103 |
| 4,796,235 | 1/1989 | Sparks et al. | 365/228 |
| 4,905,140 | 2/1990 | Sakakibara et al. | 71/103 |
| 5,047,982 | 9/1991 | Smith et al. | 365/185 |
| 5,210,854 | 5/1993 | Beaverton et al. | 711/103 |
| 5,386,539 | 1/1995 | Nishi | 711/103 |
| 5,430,447 | 7/1995 | Meier | 342/51 |
| 5,548,741 | 8/1996 | Watanabe | 711/103 |
| 5,862,075 | 1/1999 | Leconte et al. | 365/185.04 |

*Primary Examiner*—Tuan V. Thai
*Attorney, Agent, or Firm*—Thomas Schneck

[57] ABSTRACT

A memory device comprises a memory array having corresponding first access control bits to control access thereto. A second set of access control bits is provided to control write access to the first access control bits. The memory array is divided into memory blocks, each block having a corresponding access control bit. At least one such block is further subdivided into pages, each page having a corresponding control bit.

17 Claims, 4 Drawing Sheets

Access Protection Page (APP)

| bit 7 | | bit 1 | bit 0 | |
|---|---|---|---|---|
| SB 0 | | | PB 0 | byte 0 |
| | ⋮ | | | |
| SB 7 | | | PB 7 | byte 7 |
| SB/AP | | | PB/AP | byte 8 |
| WP7 | | WP 1 | WP 0 | byte 9 |
| | | | | |
| | | | | byte 15 |

5,974,500

MEMORY DEVICE HAVING PROGRAMMABLE ACCESS PROTECTION AND METHOD OF OPERATING THE SAME

TECHNICAL FIELD

The present invention relates generally to memory devices, and more specifically to providing access protection in such memory devices.

BACKGROUND ART

Electrically erasable and programmable read-only memories (EEPROM) are used wherever reprogrammable non-volatile memory is required. Typically, writing to such devices requires asserting a write enable signal to the chip at the same time the write operation takes place. This prevents inadvertent writing of the memory.

Data contained in an EEPROM, however, is susceptible to various sources of corruption. For example, transients due to powering up and powering down an EEPROM present an opportunity for data corruption. EEPROMs typically find application in harsh industrial environments, thus exposing the devices to noise spikes on the control lines. It is therefore desirable to provide enhanced protection against inadvertent writes, in addition to the simple write enable signaling presently used.

EEPROMs also find use in situations where controlled read access is desirable. For example, smart cards incorporate EEPROM-type memory which require some form of protection against unauthorized access. Such cards are used in personal banking applications, health delivery services, and so on where privacy of the information contained in the card is fundamental.

EEPROMs can be found in radio frequency identification devices (RFIDs), where the memory device is used to store information identifying the object to which an RFID tag is attached. Typically, RFID tags can be written in order to store information in addition to an identifier. RFID tags usually have some sort of write protection capability and read access control. Such read access control is currently implemented by providing password mechanisms which gate access to the memory incorporated in the tag, resulting in a bulky device.

What is needed is a strategy which prohibits reading some or all of the information contained in a memory device, as well as write access to the memory. It is desirable to avoid having additional circuitry to implement such capability, thus permitting smaller and more compact applications which require read access protection.

SUMMARY OF THE INVENTION

In accordance with the present invention a memory device comprises a memory array and access logic to control access to the memory array. A first bit store provides access information which determines the accessibility of the memory array. In a preferred embodiment of the invention, the memory array is divided into a plurality of memory blocks, each block having corresponding access information for access thereto. A second bit store contains access control information to control access to the first bit store. A write protect pin sets the second bit store to a first logic level. Write access to the first bit store is permitted when the corresponding bit in the second bit store is at a second logic level. Further in accordance with the present invention, at least one memory block is subdivided into pages. A third bit store is provided to control access to each such page.

In a first variation of the preferred embodiment, the present invention is configured as a serial memory device. In a second variation, the memory device is adapted with a parallel interface. In yet a third variation, the present invention includes a radio frequency interface to provide radio frequency signaling for use in RFID applications. The RFID interface can operate with either a serial type memory device or a parallel type memory device.

BEST MODE OF CARRYING OUT THE INVENTION

Figure 1:
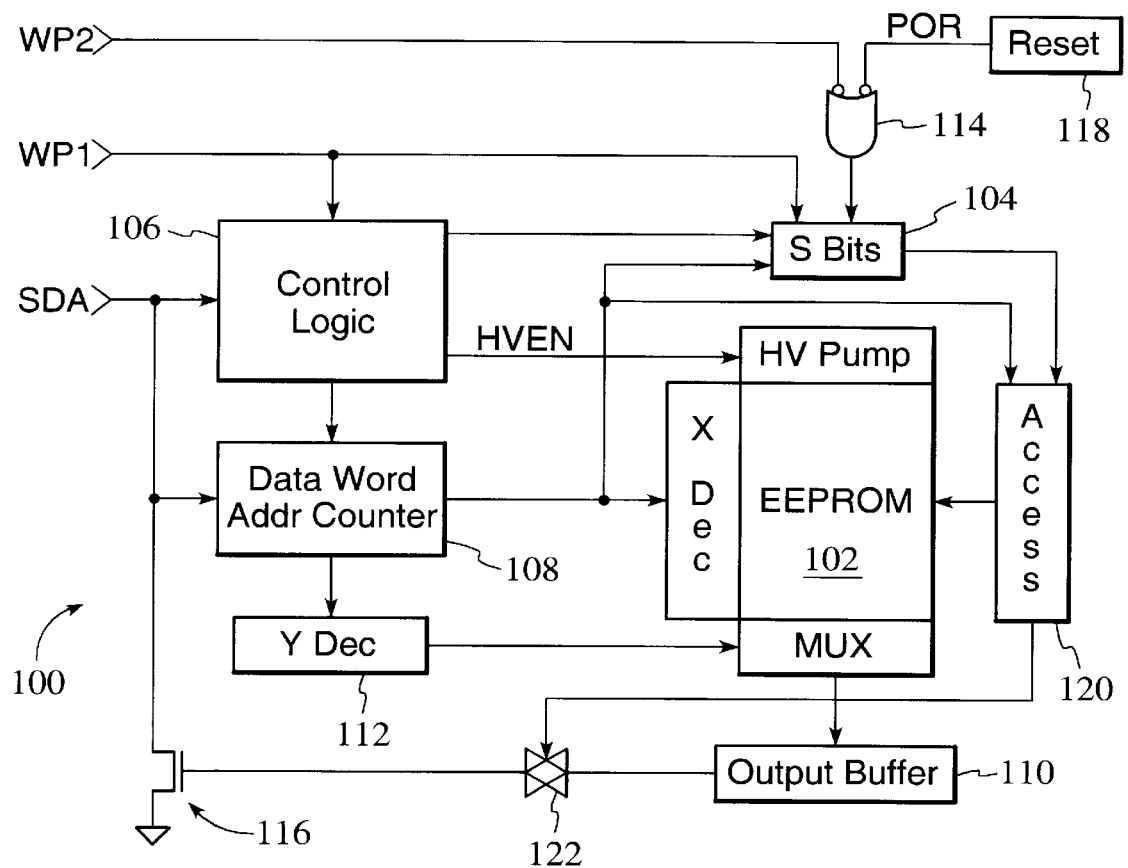
FIG. 1 shows the memory architecture of the present invention.

Referring to FIG. 1, a preferred embodiment of the memory device 100 in accordance with the present invention includes an electrically erasable programmable read only memory store (EEPROM) 102. A serial interface is provided to access the EEPROM, comprising a serial input/output data pin SDA for receiving op-codes to operate the memory device and for receiving data to be stored in the memory device. The serial data pin feeds into device control logic 106 which produces control signals to operate the memory device in accordance with received op-codes. Serial data pin SDA also feeds into a data store 108 which serves to hold data to be written into EEPROM 102, and to hold addresses for accessing the EEPROM. Memory addresses are decoded by the X decoder and the Y decoder, the latter serving as a selector input to an output MUX of EEPROM 102. The serial data pin also serves as an output pin. An output buffer 110 drives data onto serial data pin SDA via transmission gate 122 and output transistor 116. Transmission gate 122 is operated under the control of access control logic 120.

The serial interface of the memory device further comprises two write protect pins WP1, WP2, which feed into the device control logic 106 and a set of sticky bits 104. Write protect pin WP1 is a conventional write protection mechanism which prohibits writing to memory whenever the pin is asserted. Control logic 106 disables the high voltage pump of EEPROM 102 so that programming of the EEPROM is prevented when WP1 is asserted. Similarly, writes to the sticky bits 104 are disabled when WP1 is asserted.

The sticky bits are set to logic '1' when WP2 is asserted LO. The sticky bits are also set to logic '1' at power up as the power-on reset signal goes LO when the memory device becomes fully powered. In accordance with the principles of operation of the invention, a logic '0' can only be written to the sticky bits. Thus, once a logic '0' is written to a sticky bit by a user, that sticky bit cannot be subsequently reset to logic '1' except by cycling the power or by asserting WP2 LO. As will be explained below, the sticky bits feed into access control logic of EEPROM 102 in order to provide controlled access to the memory.

Figure 2B:
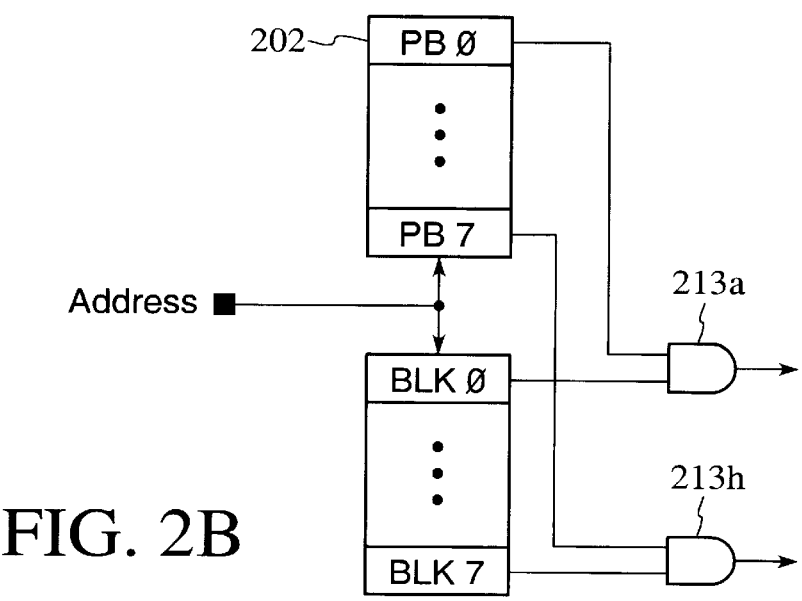
FIGS. 2A and 2B depict the access control logic shown in FIG. 1.
Figure 2A:
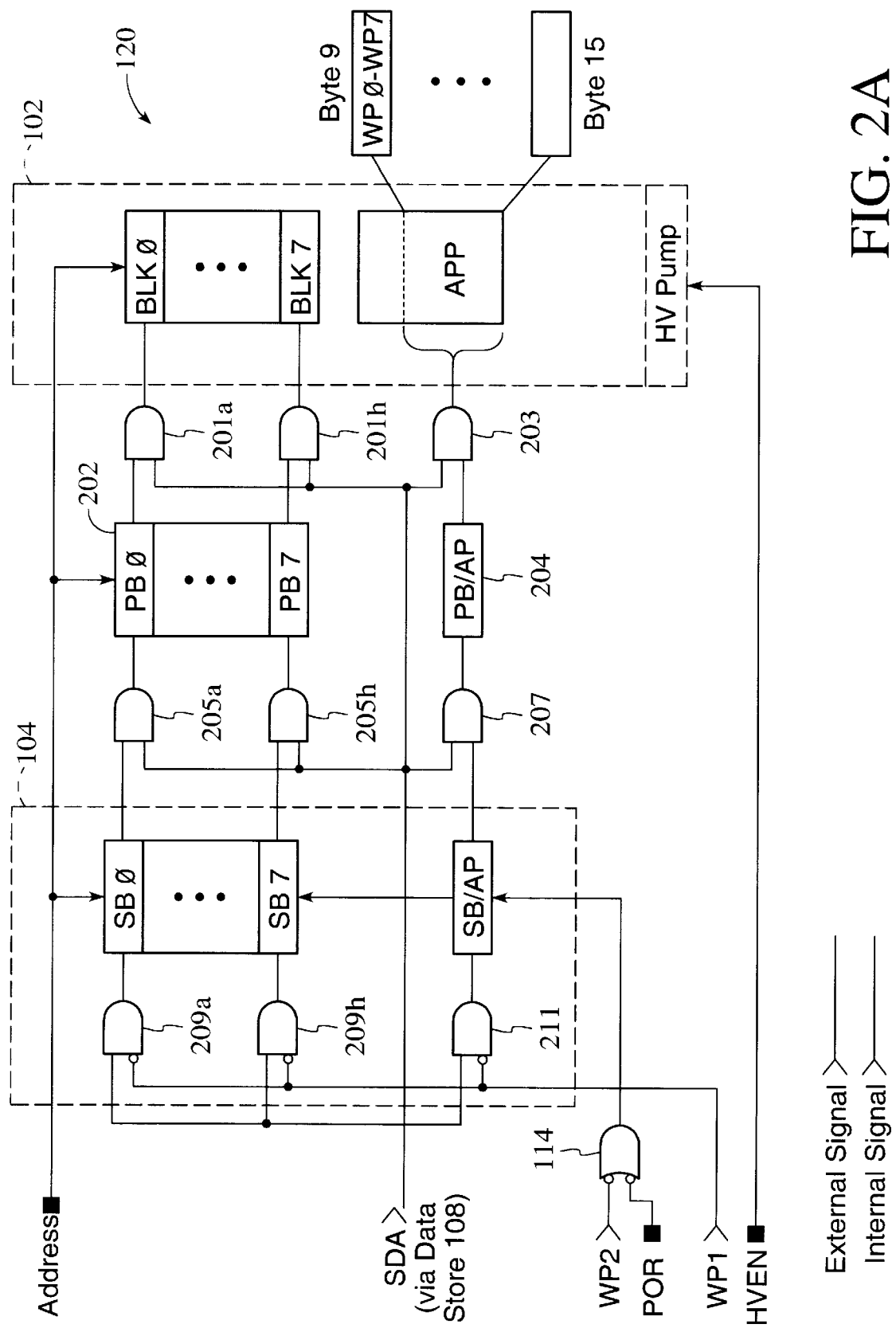

Turn now to FIG. 2A for a discussion of the access control logic 120 shown in FIG. 1. As can be seen in the schematic representation of FIG. 2A, EEPROM 102 is divided into eight memory blocks BLK0–BLK7. EEPROM 102 also includes an amount of memory known as the access protection page APP. Protection bit store 202 (PB0–PB7) contains access control information for read and write access to each block in EEPROM 102. Protection bit store 204 (PB/AP) contains access control information for the APP portion of the EEPROM. In the preferred embodiment, the protection bits 202, 204 reside in the access protection page APP.

Functionally, access control logic 120 comprises AND gates 201a–201h through which the bits in protection bit store 202 are fed, so that a determination can be made as to whether write access to memory blocks BLK0–BLK7 is permitted via serial pin SDA. Thus, protection bits PB0 control write access to block BLK0 of EEPROM 102, protection bits PB1 control write access to block BLK1, and so on. Similarly, protection bit PB/AP controls write access to access protection page APP through AND gate 203.

Access control logic 120 further comprises AND gates 205a–205h and 207. As can be seen in FIG. 2A, the sticky bits 104 provide write access control over protection bit stores 203, 204 by coupling serial data pin SDA to the protection bits through AND gates 205a–205h and 207. More specifically, a protection bit can be written only if its corresponding sticky bit is set to logic '1'. In this way, for example, sticky bit SB0 controls whether protection bit PB0 may be written.

As noted above, an aspect of the invention is that the sticky bits can only be written via the serial data pin SDA to store logic '0'. Once written to logic '0', the sticky bits can only be reset to logic '1' by asserting a LO on write protect pin WP2 or as the POR line to goes LO when the device is powered up. Thus, OR gate 114, via its inverted inputs, signals the sticky bit memory store 104 to reset to logic '1' when either of these two conditions occurs.

Also as noted above with respect to FIG. 1, write protect pin WP1 prohibits writing to EEPROM 102 by disabling the high voltage pump needed to program the memory cells of the EEPROM. In accordance with the present invention, asserting write protect pin WP1 also prohibits writing the sticky bit memory store 104, as indicated in FIG. 2A where WP1 feeds into the sticky bit memory store through AND gates 209a–209h and 211.

FIG. 2B illustrates that protection bits PB0–PB7 provide control over read access of memory blocks BLK0–BLK7, in addition to providing write control over the memory blocks. Thus, access control logic 120 (FIG. 1) includes additional logic, e.g. AND gates 213a–213h, into which the protection bits and the output of the memory blocks feed.

Figures 3, 4:
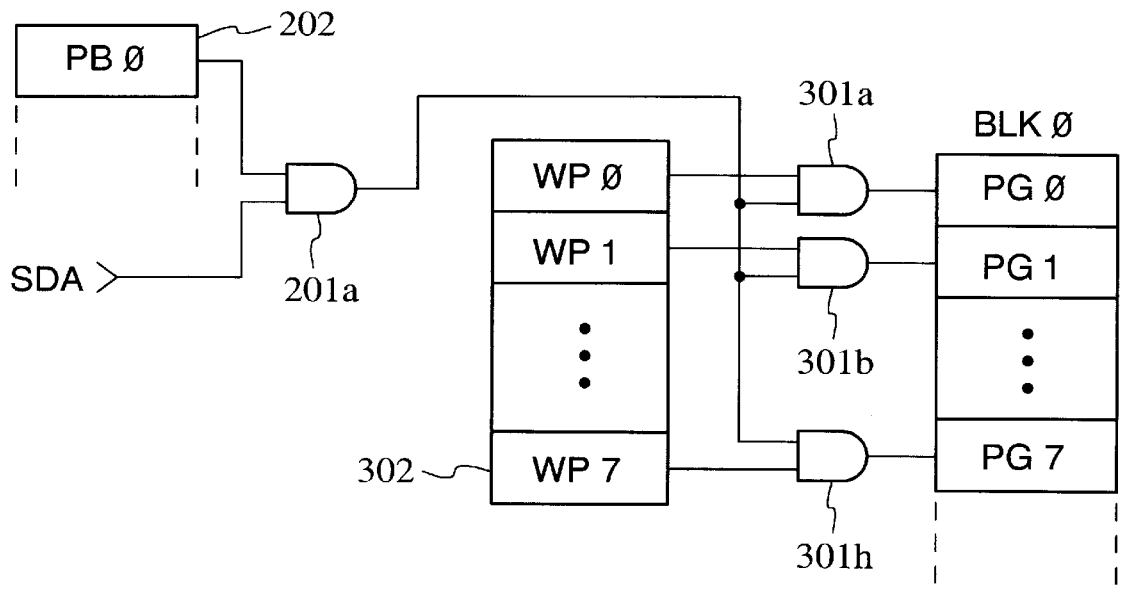
FIG. 3 illustrates the access logic for memory block 0.
FIG. 4 shows a memory map of the access protection page.

Turning now to FIG. 3, an additional level of write access protection is shown provided for memory block BLK0. Memory block BLK0 is further divided into eight pages PG0–PG7 that can be individually protected against a write operation. A set of write-protect bits 302 is combined with protection bit PB0 for the memory block via additional logic, such as AND gates 301a–301h, contained in the access control logic 120. Thus, a page in memory block BLK0 requires first that the protection bits PB0 are set to permit writing to the memory block and second that the corresponding write-protect bit is set to permit writing to the page.

The memory map shown in FIG. 4 illustrates the address mapping of the access protection page APP. The memory comprises sixteen addressable bytes, addressed from byte0–byte15. The first eight bytes contain the protection bits PB0–PB7 and the sticky bits SB0–SB7. The protection bits for a given memory block are organized in the following manner. They comprise two bits: a most significant bit (MSB) and a least significant bit (LSB), resulting in four possible combinations.

If the protection bits are set to (0,0) or (0,1), then the corresponding memory block can neither be read nor written; i.e. no access to the memory block is permitted. If the protection bits are set to (1,0), then read-only access is permitted. If the protection bits are set to (1,1), then full access (read and write) is permitted on the memory block. Thus, the protection bits each occupy two bits of each of bytes 0–7 in access protection page APP.

In the preferred embodiment, all the bits comprising the APP, except for the sticky bits, are stored in EEPROM 102. Thus when power to the device is cycled, the information contained in that portion of the APP remains intact and unaffected. The sticky bits, although they share the same address space as the APP, are stored in a memory separate from EEPROM 102. In the preferred embodiment, the sticky bits are stored in registers, such as those formed by D-type flip-flops. By so doing, the content of the sticky bits can be initialized to contain logic '1' upon power up of the memory device. In addition, the registers are coupled to the WP2 pin such that asserting the pin results in resetting the registers to contain logic '1'.

The foregoing discussion has been based on a memory device having a serial interface. It is noted that the access protection aspects of the memory device can be used in parallel memories without departing from the spirit and scope of the invention. Similarly, radio frequency interface circuitry can be used to communicate with the memory device. Thus, RFID devices can be constructed with minimum size and yet still have the benefits of a secure memory which the present invention provides.

Figure 5:
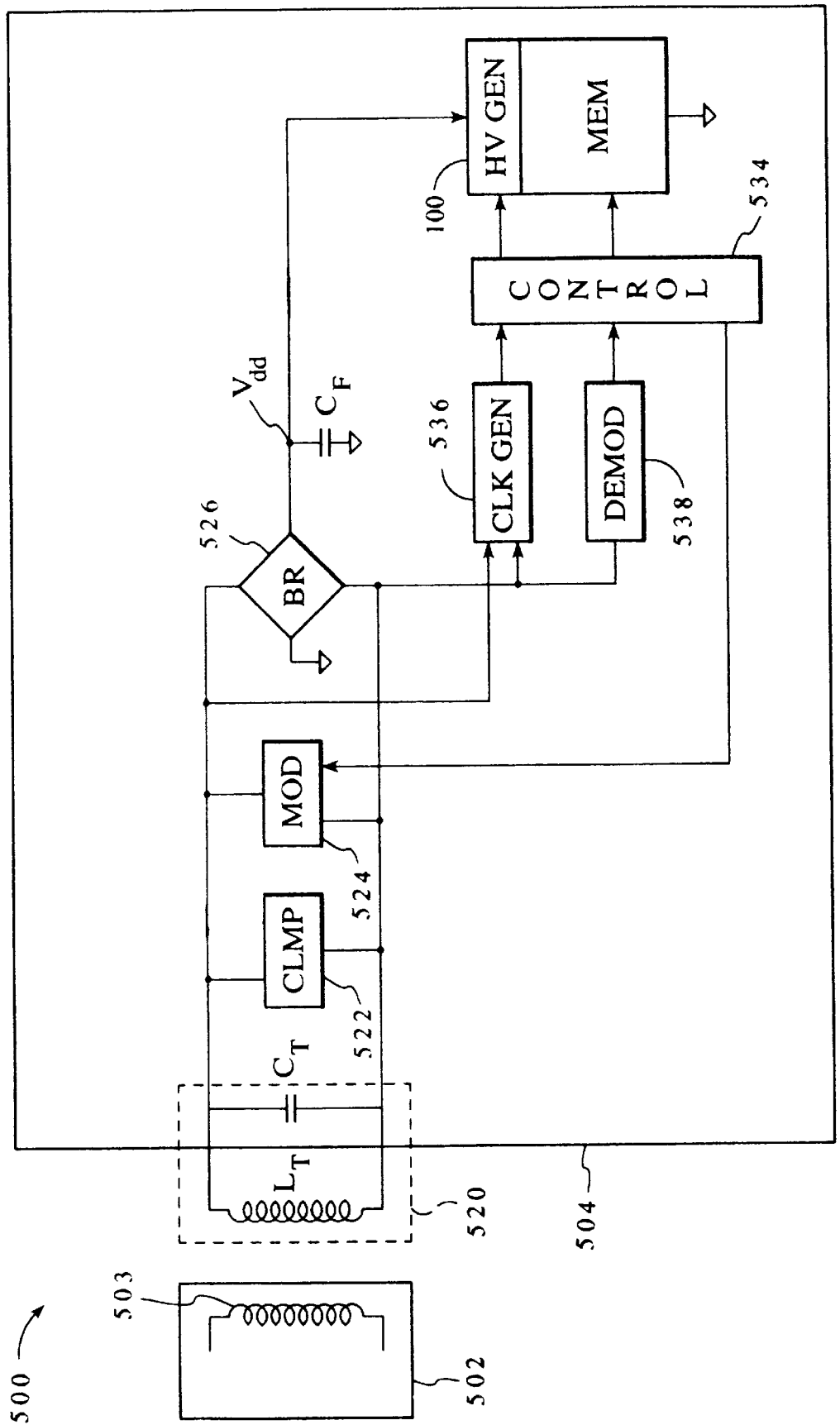
FIG. 5 shows the present invention in an RFID application.

Referring to FIG. 5, a typical RFID 500 comprises an interrogator 502 and a tag 504. The tag comprises a pick-up coil $L_p$, which together with capacitor $C_p$, forms a tank circuit 520. Coupled across the tank circuit are a voltage clamp 522, a load modulation circuit 524, and a full-wave bridge rectifier 526.

The bridge rectifier 526 charges a small supply capacitor $C_f$ to provide the supply voltage $V_{dd}$. The supply voltage provides power to the memory device 100 of the present invention. In addition to providing internal power to the tag 504, the bridge circuit 526 also provides a clock signal, based on the incoming signal from the interrogator 502, to a clock generator 536.

The modulation circuit 524, varies a load placed across the tank circuit, which varies the Q factor of the tank circuit 520. The modulation circuit operates under the control of a controller 534 to vary the Q of the tank circuit in accordance with the data to be conveyed to the interrogator 502. Data is "transmitted" when the interrogator 502 detects corresponding changes in the reflected signal. Conversely, demodulation circuit 538 demodulates an incoming data signal and feeds it into the controller 534. Typically, the data signal includes command bits and/or data bits to be written into memory device 100.

We claim:

1. A memory device comprising:
a memory array;
a first control means, coupled to the memory array, for controlling access to the memory array;
first storage means for receiving and storing memory access control information, the first control means adapted to provide access to the memory array on a basis of content of the first storage means;

second control means, coupled to the first storage means, for controlling write access to the first storage means;

second storage means for receiving and storing modification control information, the second control means adapted to provide write access to the first storage means on a basis of logic state of the second storage means;

first pin means for receiving an external signal, coupled to set the second storage means to a first logic state in response to receiving an external signal;

second pin means for receiving additional external signal, coupled to inhibit all write access to the memory array in response to receiving said additional external signal; and wherein the first storage means is a bit store and the second storage means is a bit store having a bit corresponding to each bit in the first storage means, and the second control means is adapted for permitting write access to a bit in the first storage means only if corresponding bit in the second storage means is at a second logic state.

2. The memory device of claim 1 wherein the memory array comprises a plurality of memory blocks, each memory block having corresponding memory access control information to control access thereto.

3. The memory device of claim 2 wherein the memory access control information comprises a plurality of protection bits, each protection bit being associated with a memory block.

4. The memory device of claim 3 wherein the second storage means comprises a plurality of sticky bits, each sticky bit corresponding to a protection bit.

5. The memory device of claim 1 further including means for generating a power-on-reset signal, coupled to set the second storage means to the first logic state upon powering up the memory device.

6. The memory device of claim 1 further including a high voltage pump means for providing a voltage to program the memory array, the second pin means being coupled to enable and disable the high voltage pump means in response to a received external signal.

7. The memory device of claim 1 further having either a serial interface or a parallel interface.

8. The memory device of claim 7 further including a radio frequency interface, in order to communicate with the memory device via radio frequency signalling.

9. A memory device comprising:

a memory array organized as a plurality of memory blocks;

access control logic coupled to the memory array to control read and write access thereto;

a first bit store coupled to the access control logic, the first bit store having access enable bits corresponding to each of the memory blocks, the access control logic adapted to enable and disable read and write operations to a selected memory block based on the logic levels of the access enable bits corresponding to the selected memory block;

write control logic coupled to the first bit store to write externally provided access enable information into the access enable bits;

a second bit store coupled to the write control logic, the second bit store having a plurality of bits, each bit corresponding to one of the access enable bits, the write control logic adapted to enable writing to the first bit store only when the corresponding bit in the second bit store is equal to a first logic state; and a first write protect pin coupled to the memory array to prohibit write access to the memory array when the first write protect pin is asserted to set the second bit store to a second logic state in response to receiving an external signal;

a second write protect pin coupled to the second bit store, the bits of the second bit store being set to a first logic level when the second write protect pin is asserted to LO.

10. The memory device of claim 9 wherein the first bit store is addressable and address space of the first bit store is a subset of address space of the memory array.

11. The memory device of claim 9 wherein at least one of the memory blocks is subdivided into N pages, and wherein the memory device further includes a third bit store having N page enable bits, each page enable bit corresponding to one of the N pages, the access control logic further adapted to enable and disable read and write operations to a selected page based on the logic level of the page enable bit corresponding to the selected page.

12. The memory device of claim 9 further including a radio frequency interface for communication with the memory device using radio frequency signalling.

13. A method of operating a memory device, the method comprising:

in response to a read request, detecting a logic state of permission bits associated with memory location specified in the read request and carrying out the read request if result of the detecting step indicates that the read request is permitted;

in response to a write request, detecting the logic of permission bits associated with the memory location specified in the write request and carrying out the write request if result of the detecting step indicates that the write request is permitted;

dividing the memory array into a plurality of memory blocks, associating non-volatile permission bits with each of the memory blocks, and carrying out read and write requests on a per memory block basis;

updating the permission bits, including detecting the logic states of access information associated with the permission bits and carrying out the step of updating only if the access information is at a first logic state;

updating the access information, including allowing only updates wherein the access information is changed from the first logic state to a second logic state;

setting the logic state of the access information to the first logic state upon receiving a power-on-reset signal or upon asserting an access protection pin;

subdividing one of the memory blocks into a plurality of pages, and in response to either said read or said write request to a page, detecting the logic state of non-volatile page permission bits associated with the page specified in the request and carrying out operation if result of the detecting step indicates that the request is permitted.

14. The method as claimed in claim 13 further including allocating a portion of the memory array to store the access information.

15. The method as claimed in claim 13 further including communicating read and write requests via radio frequency signalling.

16. A memory device comprising:

a memory array;

a first control means, coupled to the memory array, for controlling access to the memory array;

first storage means for receiving and storing memory access control information, the first control means adapted to provide access to the memory array on a basis of content of the first storage means;

second control means, coupled to the first storage means, for controlling write access to the first storage means;

second storage means for receiving and storing modification control information, the second control means adapted to provide write access to the first storage means on a basis of logic state of the second storage means;

first pin means for receiving an external signal, coupled to set the second storage means to a first logic state in response to receiving an external signal;

second pin means for receiving additional external signal, coupled to inhibit all write access to the memory array in response to receiving said additional external signal;

wherein the memory array comprises a plurality of memory blocks, each memory block having corresponding memory access control information to control access thereto, the memory access control information comprising a plurality of protection bits, each protection bit being associated with a memory block; and wherein the second storage means comprises a plurality of sticky bits, each sticky bit corresponding to a protection bit.

17. A memory device comprising:

a memory array organized as a plurality of memory blocks, at least one of the memory blocks being subdivided into N pages;

access control logic coupled to the memory array to control read and write access thereto;

a first bit store coupled to the access control logic, the first bit store having access enable bits corresponding to each of the memory blocks, the access control logic adapted to enable and disable read and write operations to a selected memory block based on the logic levels of the access enable bits corresponding to the selected memory block;

write control logic coupled to the first bit store to write externally provided access enable information into the access enable bits;

a second bit store coupled to the write control logic, the second bit store having a plurality of bits, each bit corresponding to one of the access enable bits, the write control logic adapted to enable writing to the first bit store based on the logic levels of the plurality of bits; and a first write protect pin coupled to the memory array to prohibit write access to the memory array when the first write protect pin is asserted;

a third bit store having N page enable bits, each page enable bit corresponding to one of the N pages, the access control logic further adapted to enable and disable read and write operations to a selected page based on logic level of the page enable bit corresponding to the selected page; and a second write protect pin coupled to the second bit store, the bits of the second bit store being set to a first logic level when the second write protect pin is asserted to LO.

* * * * *